(12) United States Patent
Song et al.

(10) Patent No.: US 6,872,374 B2
(45) Date of Patent: Mar. 29, 2005

(54) POROUS MOLYBDENUM DISILICIDE-BASED MATERIAL PREPARED BY SELF-PROPAGATING HIGH TEMPERATURE SYNTHESIS PROCESS, AND METHOD FOR PREPARING THE SAME

(75) Inventors: In-Hyuck Song, Kyungsangnam-do (KR); Hai-Doo Kim, Kyungsangnam-do (KR); Jung-Yeul Yun, Kyungsangnam-do (KR)

(73) Assignee: Korea Institute of Machinery and Materials, Kyungsangnam-do (KR)

( * ) Notice: Subject to any disclaimer, the term of this patent is extended or adjusted under 35 U.S.C. 154(b) by 202 days.

(21) Appl. No.: 10/267,210
(22) Filed: Oct. 9, 2002
(65) Prior Publication Data
US 2004/0043241 A1 Mar. 4, 2004

(30) Foreign Application Priority Data
Aug. 27, 2002 (KR) ........................................ 2002-50829

(51) Int. Cl.$^7$ .............................................. C01B 33/06
(52) U.S. Cl. ............................. 423/344; 419/2; 419/23; 419/38
(58) Field of Search ............................. 423/344; 419/2, 419/23, 38, 44, 45

(56) References Cited

U.S. PATENT DOCUMENTS 5,364,442 A * 11/1994 Sekhar ........................ 75/229
5,380,409 A * 1/1995 Munir et al. ................. 205/340
5,794,113 A * 8/1998 Munir et al. ................... 419/45

OTHER PUBLICATIONS

Yi, H.C. et al, "Self–propagating high–temperature (combustion) synthesis (SHS) of powder–compacted materials", 1990, Journal of Materials Science, 25, pp. 1159–1168, no month.*

* cited by examiner

Primary Examiner—Ngoc-Yen Nguyen
(74) Attorney, Agent, or Firm—Cooper & Dunham LLP

(57) ABSTRACT

A porous molybdenum disilicide-based material prepared by preheating a preform consisting of size-controlled molybdenum (Mo) powder and content-controlled silicon (Si) powder and igniting the preform to initiate self-propagating high temperature synthesis, and a method for preparing the same, are disclosed. The method comprises the steps of a) mixing molybdenum (Mo) powder and silicon (Si) powder in the stoichiometric ratio of 1:2; b) molding the mixed powder into a preform; c) preheating the preform under inert atmosphere; and d) igniting the top end of the preheated perform. The porous molybdenum disilicide-based material can control its pore size by appropriately controlling the size of molybdenum (Mo) powder, the content of silicon (Si) powder and preheating condition. Therefore, since the pore size gradient of the porous material is possible to form, the porous material can be used for filters with improved dirt-holding capacity.

2 Claims, 5 Drawing Sheets

POROUS MOLYBDENUM DISILICIDE-BASED MATERIAL PREPARED BY SELF-PROPAGATING HIGH TEMPERATURE SYNTHESIS PROCESS, AND METHOD FOR PREPARING THE SAME

BACKGROUND OF THE INVENTION

1. Field of the Invention

The present invention relates to a porous molybdenum disilicide-based material prepared by a self-propagating high temperature synthesis (SHS) process and a method for preparing the same. More specifically, the present invention relates to a porous molybdenum disilicide-based material prepared by preheating a preform consisting of size-controlled molybdenum (Mo) powder and content-controlled silicon (Si) powder and igniting the preform to initiate self-propagating high temperature synthesis, and a method for preparing the same.

The porous molybdenum disilicide-based material thus prepared has improved mechanical durability while providing highly controlled pore size. In addition, by orienting the porous molybdenum disilicide-based material in the form of pore size gradient, porous materials used for filters with improved dirt-holding capacity can be manufactured.

2. Description of the Related Art

In general, a self-propagating high temperature synthesis process uses heat generated when starting materials are reacted with each other. The generated heat spontaneously propagates throughout the starting materials, converting them into products. Therefore, a self-propagating high temperature synthesis process is known as an economically efficient one for producing carbides, nitrides, oxides, etc., without any externally supplied energy.

Recently, special attention has been paid to a porous heating element composed of molybdenum disilicide ($MoSi_2$) particles which has a porosity of 30~70%. In the present invention, the porous heating element is prepared from a mixture of molybdenum powder and silicon powder using a self-propagating high temperature synthesis process.

Molybdenum disilicide ($MoSi_2$) is a compound composed of molybdenum and silicon elements in a 1:2 molar ratio, commonly prepared using powder metallurgy.

Since materials containing molybdenum disilicide ($MoSi_2$) as a main component form a protective surface layer which is mainly composed of $SiO_2$ at high temperature in an oxidizing environment, they have been widely used as promising high temperature anti-oxidative heating elements.

The porous heating element prepared from molybdenum disilicide particles and remaining silicon (Si) is an electrical resistance type and has pore size capable of being freely controlled via its preparation process. The porous heating element is suitable to use for applied devices such as exhaust gas filters and heating catalyst filters which require higher porosity and excellent heating properties.

As publications describing the applications of the porous heating element, there are exemplified Korean Patent Application No. 2001-0110509 and Japanese Patent Laid-open No. Hei 11-93639. According to the publications, there is disclosed a filter for controlling fine particles in diesel exhaust which accelerate environmental pollution. In addition, Japanese Patent Laid-open No. Hei 9-42638 discloses a hot gas filter for removing dust particles from hot waste gas generated in power plants and cement plants. Furthermore, Japanese Patent Laid-open Nos. Hei 10-266827 and Hei 10-272319 disclose a technique using a porous heating element as a catalyst body.

However, no mention is made of use of a self-propagating high temperature synthesis process to prepare a porous material in these publications. Accordingly, the porous molybdenum disilicide-based heating element according to the present invention is thought to be highly inventive because its pore size and gradient property can be controlled.

SUMMARY OF THE INVENTION

Therefore, it is an object of the present invention to provide a porous molybdenum disilicide-based material prepared by controlling the particle size of molybdenum powder so as to control its pore size and controlling the content of silicon powder so as to have excellent mechanical durability, based on a self-propagating high temperature synthesis process.

It is another object of the present invention to provide a porous molybdenum disilicide-based material which has improved filtering properties through its pore size gradient.

It is yet another object of the present invention to provide a method for preparing the porous molybdenum disilicide-based material.

In accordance with the present invention, the above and other objects can be accomplished by the provision of a method for preparing a porous molybdenum disilicide-based material by a self-propagating high temperature synthesis process which comprises the steps of: a) mixing molybdenum (Mo) powder and silicon (Si) powder in the stoichiometric ratio of 1:2; b) molding the mixed powder into a preform; c) preheating the preform under inert atmosphere; and d) igniting the top end of the preheated perform.

Preferably, in step a) of mixing molybdenum (Mo) powder and silicon (Si) powder in the predetermined stoichiometric ratio, silicon (Si) powder may be further added in an amount of 1~20% by weight, based on the weight of the mixed powder, in addition to the stoichiometric ratio.

Preferably, in step c) of preheating the preform under inert atmosphere, the preform may be preheated at a temperature of from 300° C. to 800° C.

Preferably, fine molybdenum.(Mo) powder and (Si) powder may be mixed to form a top layer; molybdenum (Mo) comprising fine molybdenum (Mo) powder and coarse molybdenum (Mo) powder, and silicon (Si) powder may be mixed to form a plurality of intermediate layers, and coarse molybdenum (Mo) powder and silicon (Si) powder may be mixed to form a bottom layer, in step b) of molding the mixed powder into the preform. By such a configuration, the porous material has a pore size gradient depending on the particle size of molybdenum (Mo) powder.

In accordance with one aspect of the present invention, the above and other objects can be accomplished by the provision of a porous molybdenum disilicide-based material prepared by a self-propagating high temperature synthesis process which comprises a top layer formed from a mixture of fine molybdenum (Mo) powder and silicon (Si) powder; a plurality of intermediate layers formed from a mixture of molybdenum (Mo) powder comprising fine molybdenum (Mo) powder and coarse molybdenum (Mo) powder, and silicon (Si) powder; and a bottom layer formed from a mixture of coarse molybdenum (Mo) powder and silicon (Si) powder, such that the porous molybdenum disilicide-based material has a pore size gradient depending on the particle size of molybdenum powder.

Specifically, the top layer is composed of molybdenum disilicide ($MoSi_2$) prepared from a mixture of molybdenum (Mo) powder having an average particle size of 200 μm and silicon (Si) powder. The intermediate layers include three layers: a first layer is composed of molybdenum disilicide (MoSi$_2$) prepared from a mixture of molybdenum (Mo) powder comprising 75% of molybdenum (Mo) powder having an average particle size of 200 μm and 25% of molybdenum (Mo) powder having an average particle size of 1.5 μm, and silicon (Si) powder; a second layer is composed of molybdenum disilicide (MoSi$_2$) prepared from a mixture of molybdenum (Mo) powder comprising 50% of molybdenum (Mo) powder having an average particle size of 200 μm and 50% of molybdenum (Mo) powder having an average particle size of 1.5 μm, and silicon (Si) powder; and a third layer is composed of molybdenum disilicide (MoSi$_2$) prepared from molybdenum (Mo) powder comprising 25% of molybdenum (Mo) powder having an average particle size of 200 μm and 75% of molybdenum (Mo) powder having an average particle size of 1.5 μm, and silicon (Si) powder.

The bottom layer is composed of molybdenum disilicide (MoSi$_2$) prepared from a mixture of molybdenum (Mo) powder having an average particle size of 1.5 μm and silicon (Si) powder.

BRIEF DESCRIPTION OF THE DRAWINGS

The above and other objects, feature and other advantages of the present invention will be more clearly understood from the following detailed description taken in conjunction with the accompanying drawings, in which.

DESCRIPTION OF THE PREFERRED EMBODIMENTS

Figure 1:
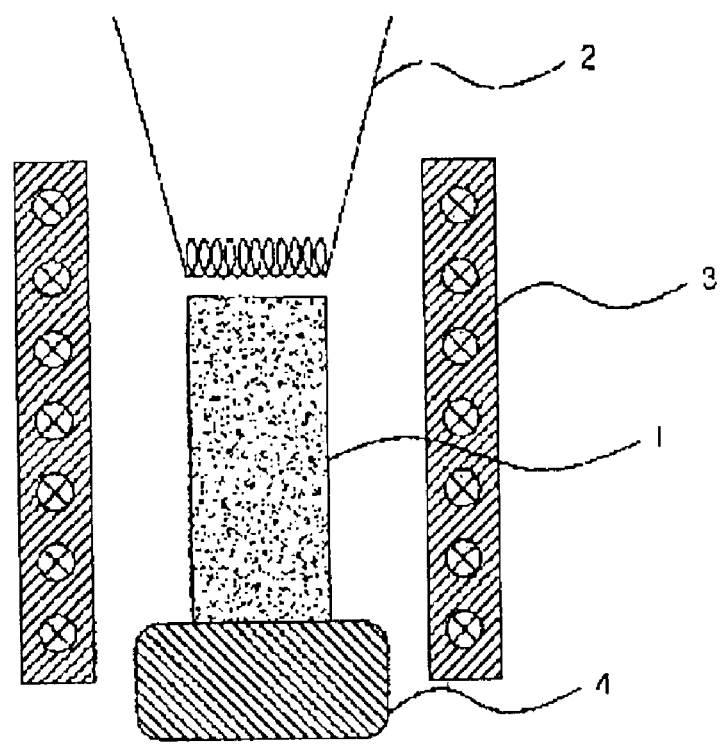
FIG. 1 is a schematic diagram of an apparatus for preparing a porous molybdenum disilicide-based material prepared by a self-propagating high temperature synthesis process according to the present invention.

The present invention will be described in detail below, in terms of several process variables.

1) Content of Silicon (Si) Powder

In order to prepare the porous molybdenum disilicide-based material by a self-propagating high temperature synthesis process according to the present invention, silicon (Si) powder is added in an amount more than the stoichiometric ratio with molybdenum (Mo) powder stoichiometrically required to form molybdenum disilicide (MoSi$_2$).

Generally, it is easy to prepare porous materials using a self-propagating high temperature synthesis process, but the process has a problem in terms of durability due to weak bonding force between particles.

In accordance with the present invention, silicon (Si) powder is used in an amount more than the stoichiometric ratio with molybdenum (Mo) powder required to form molybdenum disilicide (MoSi$_2$), in order to improve poor durability of porous materials.

The stoichiometric amount of silicon (Si) powder with molybdenum (Mo) powder is consumed to form molybdenum disilicide (MoSi$_2$), and the amount of silicon (Si) exceeding the stoichiometric amount improves the bonding force between molybdenum disilicide (MoSi$_2$) particles, thus imparting mechanical durability to the prepared porous material.

In accordance with the present invention, the excess amount of silicon (Si) powder added is within the range of from 1 to 20% by weight, based on the total weight of molybdenum (Mo) powder and silicon (Si) powder stoichiometrically required to form molybdenum disilicide. When the amount of Si powder added exceeds 20% by weight, self-propagating combustion reaction does not stably take place due to the diluent effect of excess Si powder.

2) Preheating

Molybdenum disilicide (MoSi$_2$) prepared by a self-propagating high temperature synthesis process has a low theoretical adiabatic reaction temperature. Accordingly, in the case that the compound is not completely combusted, mechanical defects occur or unreacted powder remains in pores, which makes the preparation of porous material difficult.

The excess amount of silicon (Si) powder added to improve mechanical durability acts as a factor to lower the adiabatic reaction temperature of molybdenum disilicide prepared by a self-propagating high temperature synthesis process and thus makes complete combustion reaction of reactants difficult to achieve.

The present invention can solve the above problems by preheating the preform to increase the adiabatic reaction temperature of molybdenum disilicide, before initiating self-propagating high temperature synthesis.

In accordance with the present invention, the preheating temperature is within the range of from 300° C. to 800° C. When the temperature is lower than 300° C., the preheating effect on the adiabatic reaction temperature of molybdenum disilicide is weak. Accordingly, complete combustion is not likely to happen. It is undesirable to increase the preheating temperature to higher than 800° C. in terms of economic efficiency because of enormous electrical cost and facilities to preheat the preform.

3) Particle Size of Molybdenum (Mo) Powder

The synthesis mechanism of the porous molybdenum disilicide-based material by a self-propagating high temperature synthesis process is as follows. First, silicon (Si) powder is changed into a liquid state. Silicon (Si) of liquid state surrounds molybdenum (Mo) powder and reacts with molybdenum (Mo) powder to form molybdenum disilicide (MoSi$_2$) particles. The size of the molybdenum disilicide (MoSi$_2$) particles thus formed is determined by the generated heat of combustion, not by the size of molybdenum (Mo) powder.

However, because silicon (Si) of liquid state surrounds molybdenum (Mo) powder and reacts with molybdenum (Mo) having a higher melting point, the pore size of molybdenum disilicide (MoSi$_2$) is proportional to the particle size of molybdenum (Mo) powder.

That is, the coarser the molybdenum (Mo) powder used is, the larger the formed pore size is. Based on this finding, the porous material having a desired pore size can be prepared.

In the present invention, molybdenum (Mo) powder having an average particle size of 200 μm and molybdenum (Mo) powder having an average particle size of 1.5 μm are used to prepare the porous molybdenum disilicide-based material.

4) Pore Size Gradient

Pore size gradient exhibits maximum filtering efficiency and improved durability. In accordance with the present invention, the size of silicon (Si) powder is maintained to be constant and the size of molybdenum (Mo) powder is adjusted so as to be appropriate for desired applications, when molded into the preform.

At this time, molybdenum (Mo) powder with various particle sizes is mixed with silicon (Si) powder, and the mixtures are classified on the basis of the size of molybdenum (Mo) powder to form a multilayered structure (≧two layers).

In order to inhibit peeling due to the thermal contraction and expansion occurring due to the self-propagating high temperature synthesis process, difference in powder size between adjacent layers should be minimized. Accordingly, a continuous pore size gradient of layers is advantageous.

In order to form layers having different porosities into a multilayered structure, molybdenum (Mo) powder having an average particle size of 200 μm (hereinafter, referred to as "M") and molybdenum (Mo) powder having an average particle size of 1.5 μm (hereinafter, referred to as "m") are used. Specifically, the layers are formed from 100% M, 75% M–25% m, 50% M–50% m, 25% M–75% m and 100% m, respectively, to accomplish the pore size gradient of layers.

These and other advantages of the invention are illustrated in greater detail below with reference to preferred examples.

EXAMPLE 1

Molybdenum (Mo) powder having an average particle size of 1.5 μm and silicon (Si) powder having an average particle size of 45 μm were weighed in the stoichiometric ratio of 1:2, and mixed by a ball milling method. The mixture was dried in a temperature-controlled bath at a temperature of 200° C.

The mixture was molded into a cylindrical structure (diameter: 2.54 cm, height: 4 cm) at a pressure of 10 MPa to produce a preform. As shown in FIG. 1, the preform 1 was placed on a ceramic holder 4, and preheated using a preheater 3 at a temperature of from 300 to 800° C. under inert atmosphere for 10 minutes. The top end of the preform 1 was ignited using a tungsten heater 2 and subjected to self-propagating high temperature synthesis to prepare a porous molybdenum disilicide-based material.

Figure 2:
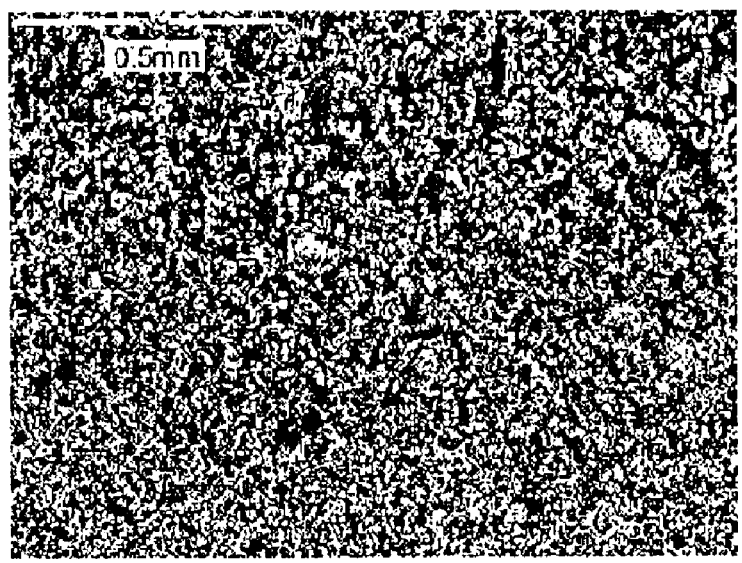
FIG. 2 shows the microstructure of a porous molybdenum disilicide-based material prepared from a mixture of molybdenum (Mo) powder having an average particle size of 1.5 μm and silicon (Si) powder having an average particle size of 45 μm, in accordance with a method for preparing a porous molybdenum disilicide-based material prepared by a self-propagating high temperature synthesis process according to the present invention.

The microstructure of the porous molybdenum disilicide-based material prepared from a mixture of molybdenum (Mo) powder having an average particle size of 1.5 μm and silicon (Si) powder having an average particle size of 45 μm is shown in FIG. 2.

When the preheating temperature was lower than 300° C., the preheating effect on the adiabatic reaction temperature of molybdenum disilicide (MoSi$_2$) was weak and complete combustion reaction did not occur.

EXAMPLE 2

Molybdenum (Mo) powder having an average particle size of 200 μm and silicon (Si) powder having an average particle size of 45 μm were weighed in the stoichiometric ratio of 1:2, and the silicon (Si) powder was further added in an amount of from 1 to 20% by weight, based on the total weight of molybdenum (Mo) powder and silicon (Si) powder thereto. The weighed powder was mixed by a ball milling method, and dried in a temperature-controlled bath at a temperature of 200° C.

After the mixture was molded into a cylindrical structure at a pressure of 10 MPa to produce a preform 1, the preform 1 was preheated at a temperature of 500° C. under inert atmosphere for 10 minutes. As shown in FIG. 1, the top end of the preform 1 was ignited using the tungsten heater 2 and subjected to self-propagating high temperature synthesis to prepare a porous molybdenum disilicide-based material.

Figure 3:
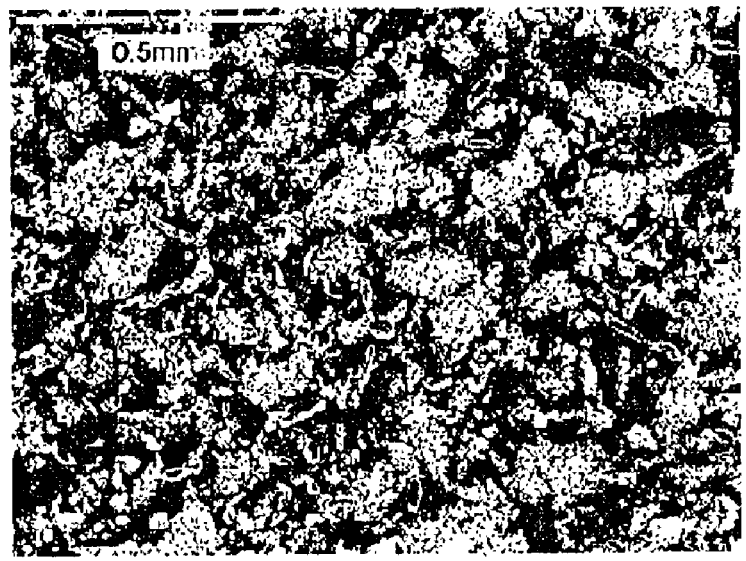
FIG. 3 shows the microstructure of the porous molybdenum disilicide-based material prepared from a mixture of molybdenum (Mo) powder having an average particle size of 200 μm and silicon (Si) powder having an average particle size of 45 μm, in accordance with a method for preparing a porous molybdenum disilicide-based material prepared by a self-propagating high temperature synthesis process according to the present invention.

The microstructure of the porous molybdenum disilicide-based material prepared from a mixture of molybdenum (Mo) powder having an average particle size of 200 μm and silicon (Si) powder having an average particle size of 45 μm is shown in FIG. 3. From FIG. 3, it is clearly seen that the porous molybdenum disilicide-based material has pores larger than the porous molybdenum disilicide-based material of Example 1 prepared using molybdenum (Mo) powder having an average particle size of 1.5 μm.

When the amount of silicon (Si) powder was further added in an amount exceeding 20% by weight, self-combustion reaction did not stably take place due to the diluent effect of excess silicon (Si) powder.

EXAMPLE 3

In order to impart pore size gradient property, five layers having different particle sizes of molybdenum (Mo) powder were molded into a multilayered preform.

Figure 4:
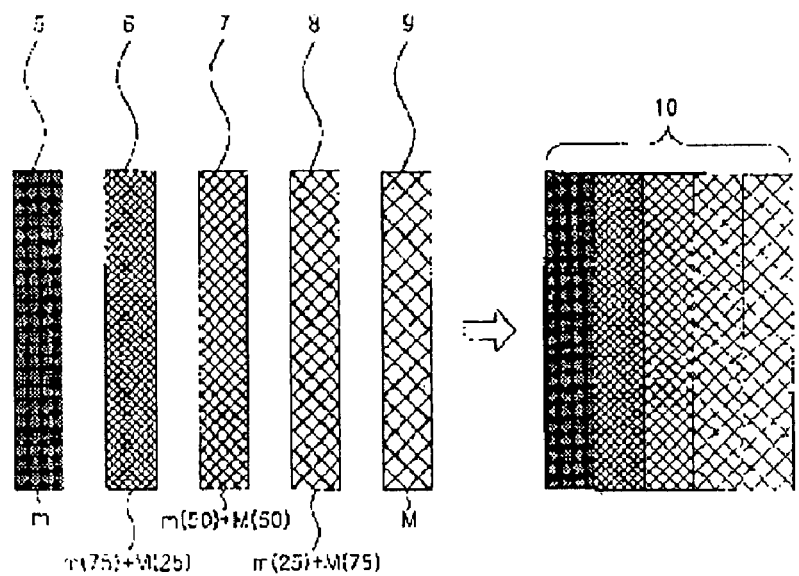
FIG. 4 is a schematic diagram showing the step of molding a plurality of layers formed from mixtures of coarse molybdenum (Mo) powder and fine molybdenum (Mo) powder with various mixing ratios into a multilayered preform, in accordance with a method for preparing a porous molybdenum disilicide-based material prepared by a self-propagating high temperature synthesis process according to the present invention.

That is, as shown in FIG. 4, coarse molybdenum (Mo) powder having an average particle size of 200 μm (hereinafter, referred to as "M") and fine molybdenum (Mo) powder having an average particle size of 1.5 μm (hereinafter, referred to as "m") were used to form five layers. Specifically, 100% m was used to form a first layer 5, 75% m–25% M was used to form a second layer 6, 50% m–50% M was used to form a third layer 7, 25% M–75% m was used to form a fourth layer 8 and 100% M was used to form a fifth layer 9, respectively. Each of molybdenum (Mo) powder and silicon (Si) powder were mixed in the stoichiometric ratio of 1:2 by a ball milling method to obtain the five mixtures.

The respective mixtures thus obtained were charged into a molding machine and molded at a pressure of 10 Mpa to produce a preform 1. Subsequently, the preform 1 was preheated at a temperature of 500° C. under inert atmosphere for 10 minutes. As shown in FIG. 1, the top end of the preform 1 was ignited using the tungsten heater 2 and subjected to self-propagating high temperature synthesis to prepare a porous molybdenum disilicide-based material.

Figure 5:
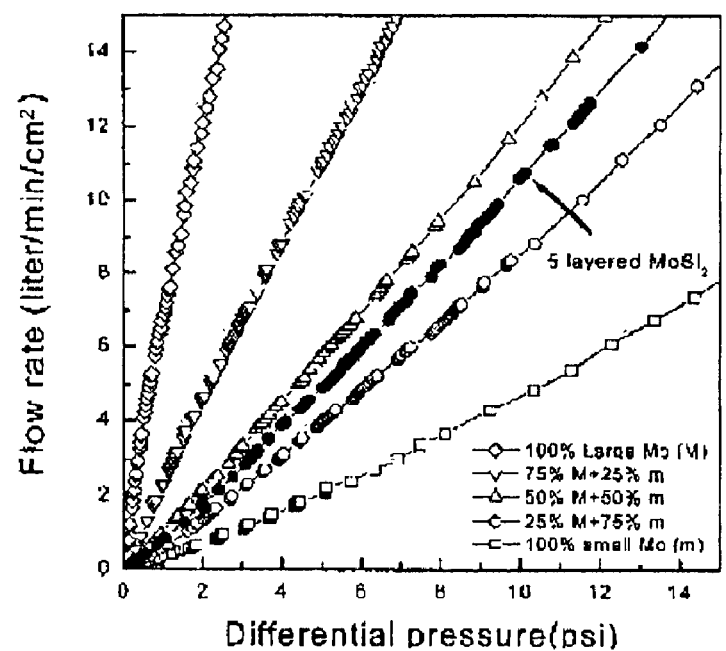
FIG. 5 is a graph comparing the gas flow rate of a porous molybdenum disilicide-based material with that of a multi-layered porous material, as prepared by a self-propagating high temperature synthesis process in accordance with the present invention.

FIG. 5 is a graph comparing the gas flow rate of the porous molybdenum disilicide-based material with that of the multilayered porous material, as prepared by a self-propagating high temperature synthesis process in accordance with the present invention.

FIG. 5 shows that since molybdenum (Mo) powder having a large average particle size exhibited higher porosity than molybdenum (Mo) powder having a small average particle size, the gas flow rate of the porous material prepared using molybdenum (Mo) powder having the large average particle size was higher.

In addition, it is clearly seen that the porous molybdenum disilicide-based material having the pore size gradient, as shown in FIG. 4, exhibited a higher gas flow rate than the porous molybdenum disilicide-based material prepared using molybdenum (Mo) powder (25%) having an average particle size of 200 μm and molybdenum (Mo) powder (75%) having an average particle size of 1.5 μm, but exhibited a lower gas flow rate than the porous molybdenum disilicide-based material prepared using molybdenum (Mo) powder (50%) having an average particle size of 200 μm and molybdenum (Mo) powder (50%) having an average particle size of 1.5 μm.

As can be seen from the foregoing, the present invention can provide a porous heating material by appropriately, controlling the size of molybdenum (Mo) powder, the content of silicon (Si) powder and preheating condition. In order to control the pore size of the porous material, variations to the size of molybdenum (Mo) powder was made in the present invention. Therefore, since the pore size gradient of the porous molybdenum disilicide-based material is possible to form, the porous molybdenum disilicide-based material of the present invention can be used for filters with improved dirt-holding capacity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. In a method for preparing a porous molybdenum disilicide-based material by a self-propagating high temperature synthesis process comprising the steps of:

compressing a mixture of molybdenum powder and silicon powder; and igniting the compressed mixture;

the improvement comprising the step of:

using particle sizes of the molybdenum powder in the mixture to proportionally control pore size of the porous molybdenum disilicide-based material.

2. A for preparing a porous molybdenum disilicide-based material by a self-propagating high temperature synthesis process, comprising the steps of a) mixing molybdenum (Mo) powder and silicon (Si) powder in the stoichiometric ratio of 1:2; b) molding the mixed powder into a preform; c) preheating the preform under inert atmosphere; and d) igniting the top end of the preheated preform;

wherein in step b) of molding the mixed powder into the preform, fine molybdenum (Mo) powder and silicon (Si) powder is mixed to form a top layer;

molybdenum (Mo) comprising fine molybdenum (Mo) powder and coarse molybdenum (Mo) powder, and silicon (Si) powder is mixed to form a plurality of intermediate layers, and coarse molybdenum (Mo) powder and silicon (Si) powder is mixed to form a bottom layer, such that the porous molybdenum disilicide-based material has a pore size gradient depending on the particle size of molybdenum powder.

* * * * *